United States Patent [19]

Beck

[11] Patent Number: 5,630,485

[45] Date of Patent: May 20, 1997

[54] TELESCOPING VIBRATION DAMPER WITH A TWO DISK BASE VALVE

[75] Inventor: Hubert Beck, Eitorf, Germany

[73] Assignee: Fichtel & Sachs AG, Eitorf, Germany

[21] Appl. No.: 396,175

[22] Filed: Feb. 24, 1995

[30] Foreign Application Priority Data

Feb. 26, 1994 [DE] Germany .................. 44 06 349.0

[51] Int. Cl.⁶ .................................................. F16F 9/34
[52] U.S. Cl. ............... 188/322.14; 188/315; 137/493.8; 137/493.9
[58] Field of Search ................... 188/322.14, 322.15, 188/315, 316, 317, 312; 137/493.8, 493.9

[56] References Cited

U.S. PATENT DOCUMENTS

| 4,121,704 | 10/1978 | Nicholls ........................ 137/493.8 X |
| 4,782,925 | 11/1988 | Grundei .......................... 188/322.14 |
| 5,251,927 | 10/1993 | Charles et al. ............... 188/322.14 X |

FOREIGN PATENT DOCUMENTS

| 2257556 | 5/1974 | Germany . |
| 1493607 | 11/1977 | United Kingdom ........... 188/322.15 |
| 2180621 | 4/1987 | United Kingdom ........... 188/322.14 |

*Primary Examiner*—Peter M. Poon
*Attorney, Agent, or Firm*—Nils H. Ljungman and Associates

[57] ABSTRACT

Telescoping vibration damper consisting of a work cylinder and a jacket tube forming an equalization chamber, whereby there is a base valve in the floor of the work cylinder. The object is to create a simple base valve which can be simply and economically manufactured and which allows an optimum flexibility of design, whereby the correct formation of the control edges can be easily accomplished. To achieve this object, the base valve is realized in the form of at least two disks with corresponding notches, whereby the notches of both disks jointly form the flow connection of the base valve and are connected with corresponding valve disks to form a single component.

14 Claims, 7 Drawing Sheets

TELESCOPING VIBRATION DAMPER WITH A TWO DISK BASE VALVE

BACKGROUND OF THE INVENTION

1. Field of the Invention

The present invention generally relates to a telescoping vibration damper that includes a work cylinder, a piston mounted on a piston rod, the piston dividing the work cylinder into two work chambers, and a jacket tube which coaxially surrounds the work cylinder and forms an equalization chamber, whereby a base valve is located in the floor of the work cylinder to create a flow connection between the lower work chamber and the equalization chamber.

2. Background Information

Known are telescoping vibration dampers, such as enclosed in German Patent No. 22 57 556, in which the body of the base valve is either manufactured from a single piece of steel sheet, which is given its final shape by cold pressing in a series of subsequent work processes, or molded from metal powder and sintered. With valve bodies made of steel sheet, the required material thickness places limits on shaping. As a result, the control edges can no longer be manufactured with precision. With base valves having valve bodies made of metal powder, the control edges may need to be recalibrated and vapor treated. Consequently, the components produced may be very precise, but they can also be expensive.

OBJECT OF THE INVENTION

The object of the present invention is to create a body for a base valve which can be economically manufactured using the simplest of means, making possible an optimum variety of shapes of satisfactory quality and tolerances with respect to the flow connection and the formation of the control edges.

SUMMARY OF THE INVENTION

To achieve this object, the invention teaches that at least two disks with notches are preferably non-rotationally mounted with respect to one another to form the flow connection, whereby the notches of both disks together form the flow connection for the decompression and compression stage, and that the top and bottom of the base valve are covered by valve disks.

The invention teaches that it is advantageous that the individual parts are manufactured as thin disks forming channel and control edges and which, together with an additional disk, form the body of the base valve, whereby both disks can be easily and economically manufactured by means of stamping.

An additional advantageous feature is that the two disks are preferably prevented from rotating by means of a positive interlock, or form fit, such as with one disk at least partly engaged in the other disk. It is advantageous that the positive interlock, by means of a corresponding geometry, preferably occurs at multiple sites around the circumference so that, during automated assembly of the base valve, essentially only short rotations are necessary to automatically achieve the correct positioning. The bottom disk preferably has a somewhat larger diameter so that the resulting shoulder on the edge of both disks can act as a seat for the work cylinder. The completed base valve is then preferably pushed with a slight force fit into the work cylinder as usual, whereby the internal axial pretension force of the enclosed vibration damper ensures the seal of the lower work chamber with respect to the equalization chamber.

In one favorable embodiment, the disks can be laser-welded to prevent them from rotating.

An additional embodiment of the present invention contemplates that the disks are realized as stampings.

It can be advantageous if the disks are manufactured from sheet metal.

In one embodiment which is favorable in terms of manufacturing characteristics, the disks and the valve disks can have a center bore and all the parts can be mounted on a common pin and are secured on both sides.

In another configuration of the invention, at least one disk can be equipped with centering projections which are engaged in the notches of the other disk, forming a positive interlock.

Another feature contemplated by the present invention is that the pin has a shoulder on one end and a retaining ring on the other end.

It can be advantageous if the retaining ring is bolted, welded, riveted or otherwise fastened to the pin.

It should be understood that when the word "invention" is used in this application, the word "invention" includes "inventions", that is, the plural of "invention". By stating "invention", Applicant does not in any way admit that the present application does not include more than one patentably and non-obviously distinct invention, and maintains the possibility that this application may include more than one patentably and non-obviously distinct invention. The Applicant hereby asserts that the disclosure of this application may include more than one invention, and, in the event that there is more than one invention, that these inventions may be patentable and non-obvious, one with respect to the other.

One aspect of the invention resides broadly in a vibration damper for damping vibrations of a motor vehicle. The vibration damper comprising a first tubular member comprising a first apparatus for attaching the first tubular member to one of: a wheel suspension and a support structure of the motor vehicle; the first tubular member defining a first chamber therewithin, said first chamber comprising damping fluid therewithin, and the first tubular member defining a longitudinal dimension; a piston rod apparatus having a first end within the first tubular member and a second end external to the first tubular member, the piston rod apparatus being movable within the first tubular member in a direction along the longitudinal dimension of the first tubular member; apparatus for attaching the second end of the piston rod apparatus to the other of: the wheel suspension and the support structure of the motor vehicle; a piston device disposed at the first end of the piston rod apparatus, the piston device having a first side disposed adjacent the piston rod apparatus and a second side opposite the first side, and the piston device dividing the first chamber into a first chamber portion adjacent the first side thereof and a second chamber portion adjacent the second side thereof; the piston device comprising a work cylinder; the work cylinder being divided into two work chambers including a first work chamber and a second work chamber; a passage for leading damping fluid from the work chamber; a base valve disposed in the base of the work cylinder; the base valve comprising a flow connection of damping fluid between the second work chamber and the passage to permit flow from the second work chamber to the passage; the base valve comprising at least a first disk and a second disk; the first disk and second disk comprising apertures; the apertures comprising an apparatus for mounting the first disk and the second disk non-rotationally with respect to one another to form the flow connection; the apertures of the first and second disks comprising at least a part of the flow connection between the second work chamber and the passage; the apertures of the first and second disks comprising at least a first flow connection and a second flow connection; the first flow connection comprising a first check valve for permitting flow in a direction from the second work chamber to the passage; the second flow connection comprising a second check valve for permitting flow in a direction from the passage to the second work chamber; the first check valve comprising at least one disk valve; the second check valve comprising at least one disk valve; the base valve having a first side and a second side; the first disk valve being disposed on the first side of the base valve; and the second disk valve being disposed on the second side of the base valve.

BRIEF DESCRIPTION OF THE DRAWINGS

The present invention is explained below in greater detail, with reference to the accompanying drawings, in which.

DESCRIPTION OF THE PREFERRED EMBODIMENT

Figure 1:
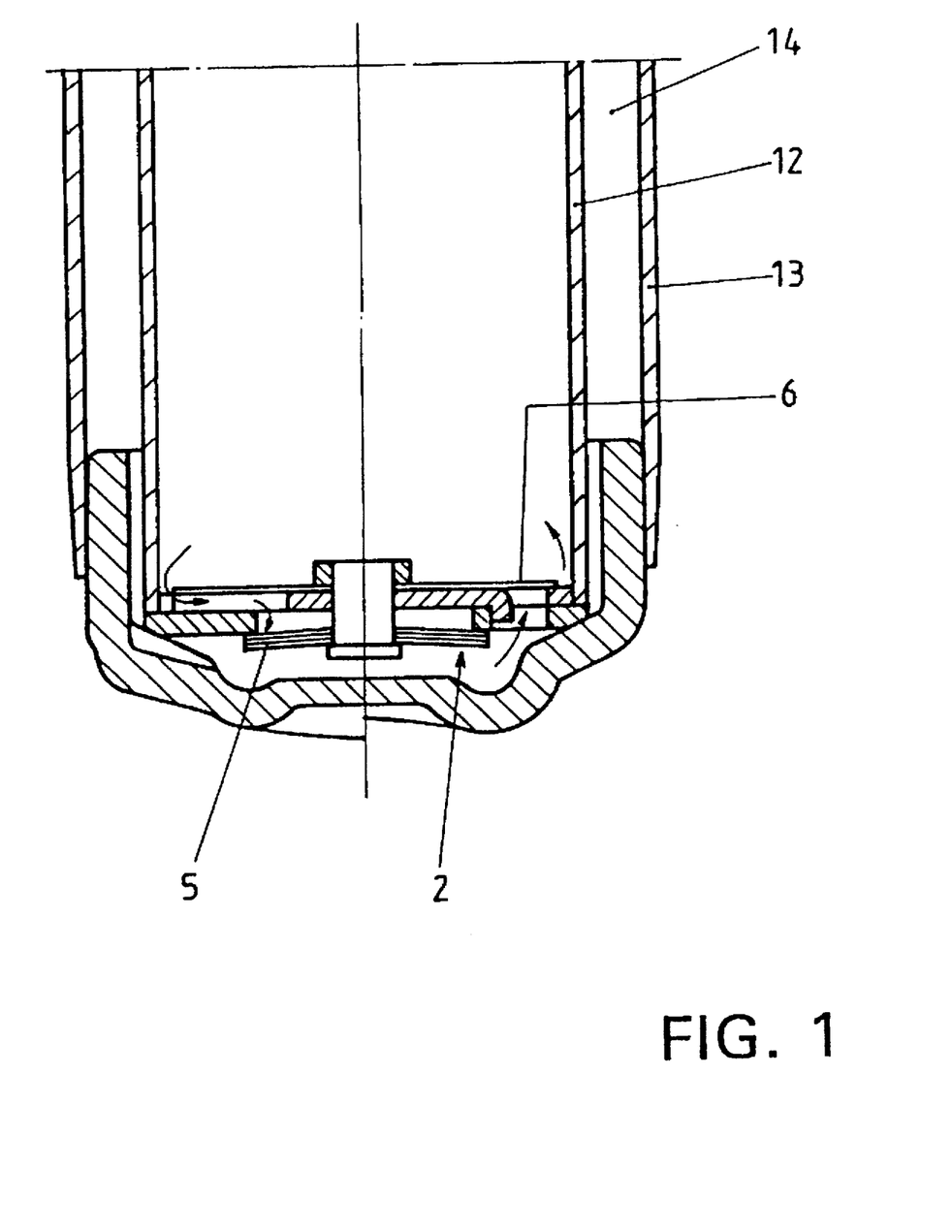
FIG. 1 shows a vibration damper cut away in the area of the base valve.

FIG. 1 shows the lower region of a telescoping vibration damper, including a work cylinder 12, a base valve 2 and a jacket tube 13 which, together with the work cylinder, essentially forms an equalization chamber 14. The base valve 2 can form a flow connection between the bottom work chamber of the work cylinder 12 and the equalization chamber 14, whereby valve disks 5 and 6 can control the flow connection in the decompression or compression stage of the vibration damper.

Figure 10:
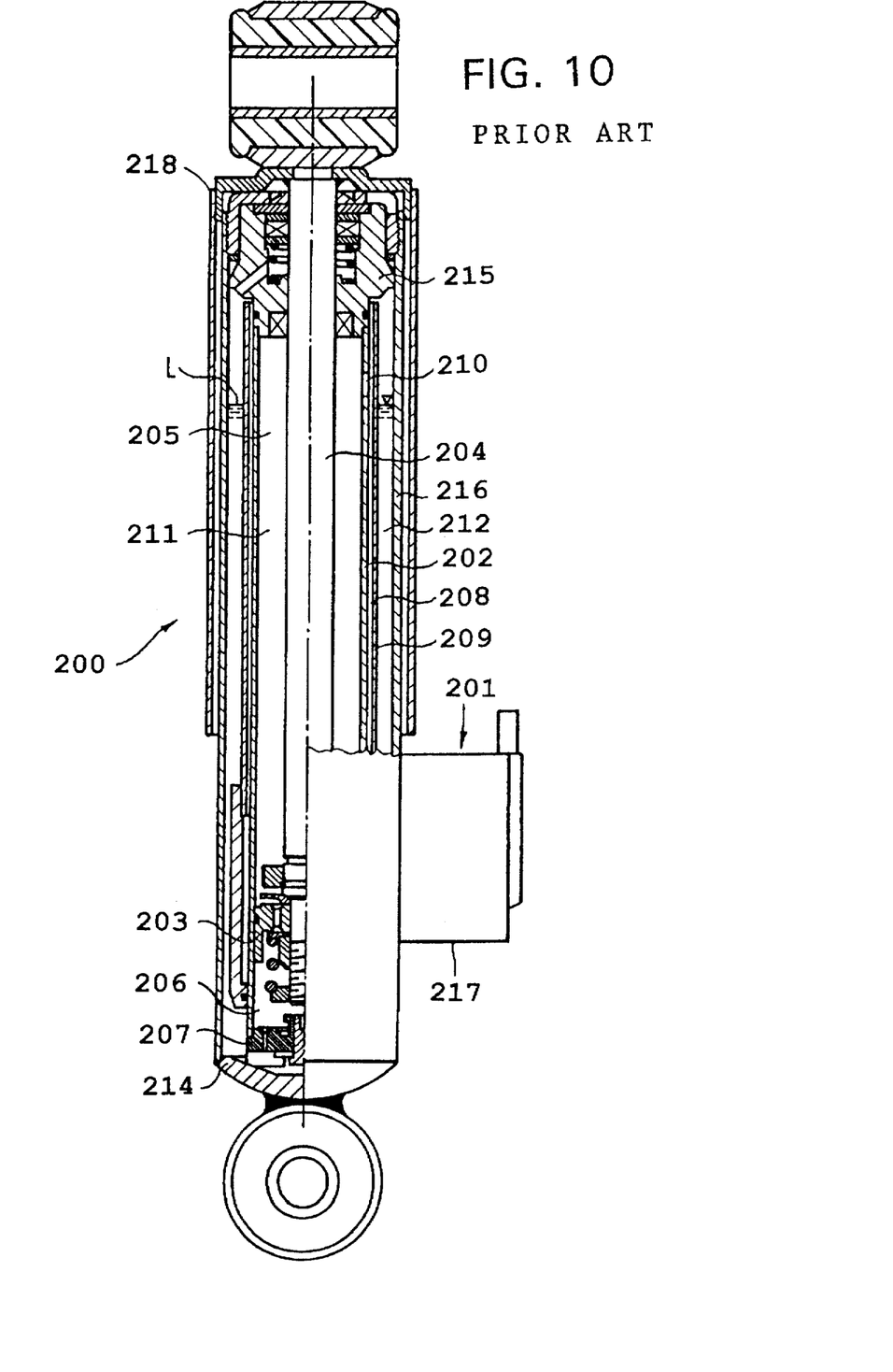
FIG. 10 shows a typical shock absorber in which the embodiments of the present invention could be incorporated.

FIG. 1 shows a base valve 2 as could conventionally be used in a vibration damper as depicted in FIGS. 13 through 22. Such a vibration damper could be a component of a shock absorber as shown in FIG. 10.

Figure 2:
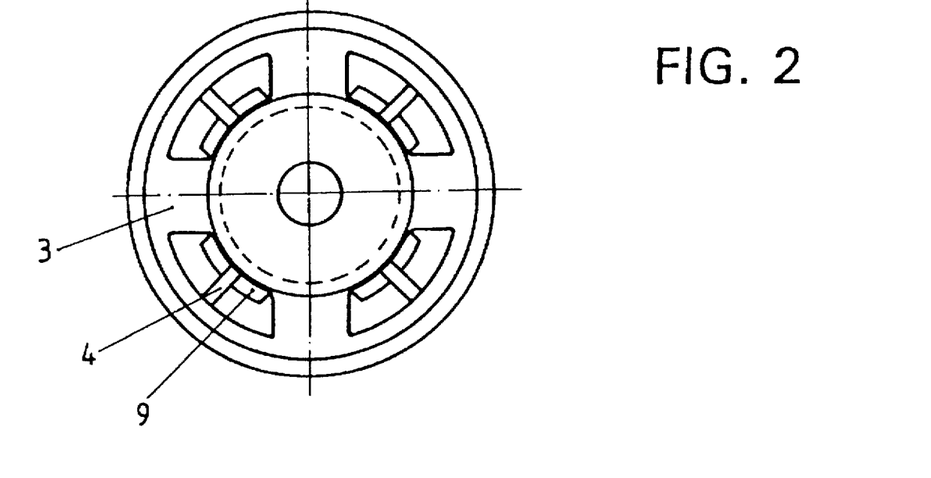
FIG. 2, 2a, and 2b, respectively, show a base valve assembly in an overhead view, in an edge-on view and from below.
Figure 2A:
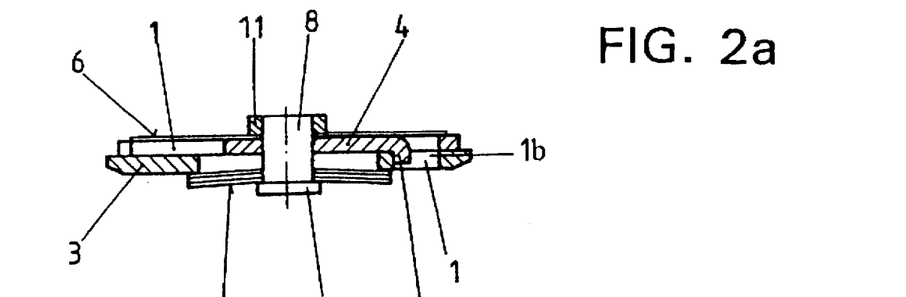
Figure 2B:
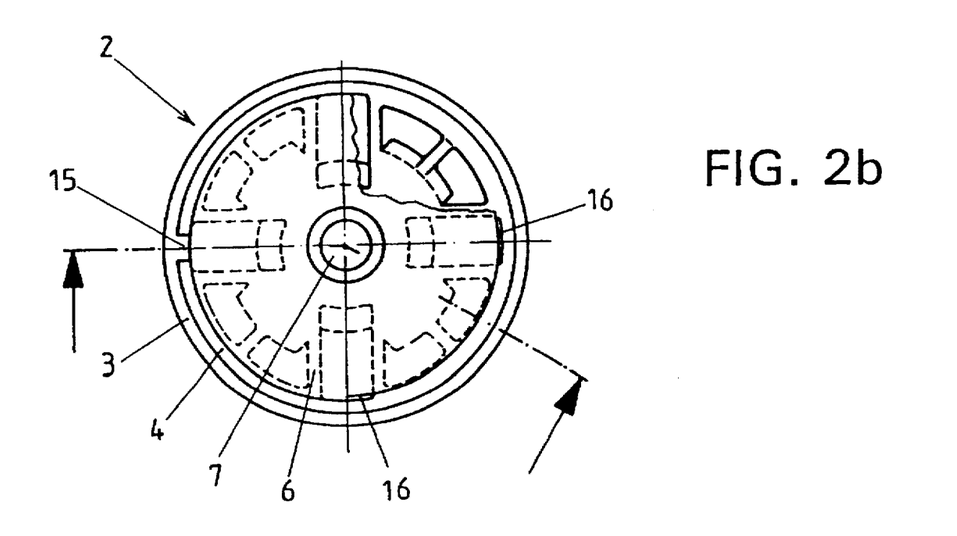

FIGS. 2, 2a, and 2b, respectively, show detail views of the base valve 2 as seen from below, from the side and from above. As shown in FIG. 2a, the valve disks 5, the disk 3, the disk 4 and the valve disks 6 are preferably placed in sequence on the pin 8 and they are preferably axially pretensioned and held in place by means of the retaining ring 11.

The risk of play between the disks is substantially decreased, or possibly eliminated, as a result of the positive interlock wherein disk 3 may preferably be at least partly engaged in disk 4 or, likewise, disk 4 may be engaged at least partly in disk 3.

As shown in FIGS. 2, 2a, and 2b, the disk 3 and disk 4 preferably have notches which, in the fully-assembled base valve, preferably form the flow connections 1 for the decompression and compression stages. Center bore 7 is preferably for the insertion of pin 8, whereby the pin 8 is preferably provided with a shoulder 10 on one end and the retaining ring 11 on the other. The disks 3 and 4 can be manufactured as stampings, whereby the centering projections 9 of the disk 4 can preferably be engaged in the notches of the disk 3 in such a manner as to essentially both prevent rotation and fix the disk in position. Because the disks 3 and 4 can be manufactured in the form of thin disks of sheet metal, the control edges can generally be easily manufactured by means of stamping, which not only makes it possible to generally manufacture them economically, but also to essentially define a precise cross-section and consequently a precise flow volume.

FIG. 2 is a bottom view of the disk 3, whereby the centering projections 9 of the disk 4 are engaged in the notches of the disk 3, thus essentially preventing rotation.

In an embodiment of the invention, when these centering projections 9 are not included, the pin 8, for example, can preferably help fasten disks 3 and 4 non-rotationally to one another.

FIG. 2b is a top view of the top disk 4, the bottom disk 3 and the valve disk 6, whereby in this embodiment, there is only a fixed opening 15 on the left for the pressure stage of the vibration damper, while on the right, the valve disk for the pressure stage also leaves the notches 16 open to produce an essentially different flow behavior.

Such differences in flow behavior are essentially desired because more pressure is usually required at opening 15 in order to open valve disk 5 than is usually required at aperture 1b, as shown in FIG. 2a, in order to open valve disk 6.

Furthermore, the notches 16 may also essentially be in the form of holes, orifices, or apertures which can essentially fit disks 3 and 4 together. Disk 3 can preferably be engaged into disk 4 whereby the apertures or notches 16 essentially form the flow connections 1 for the damping fluid. Or, alternatively, disk 4 can essentially be engaged into disk 3 whereby the apertures or notches 16 essentially form the flow connections 1 for the damping fluid.

Figure 2C:
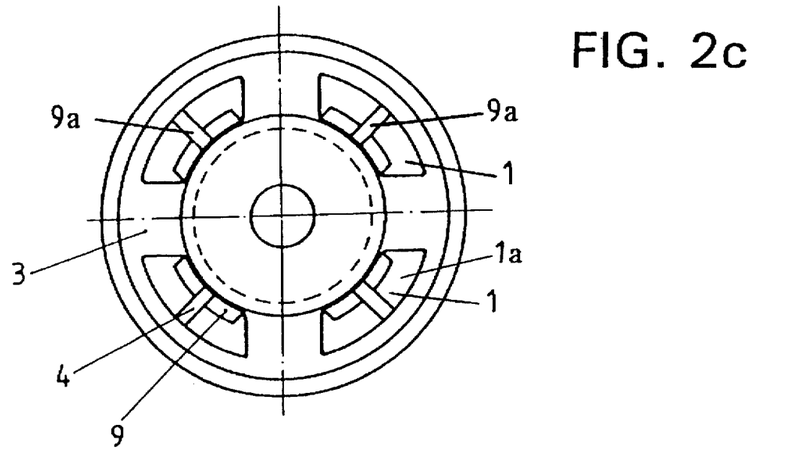
FIGS. 2c, 2d, and 2e show substantially the same views as FIGS. 2, 2a, and 2b, respectively, but show additional components.
Figure 4:
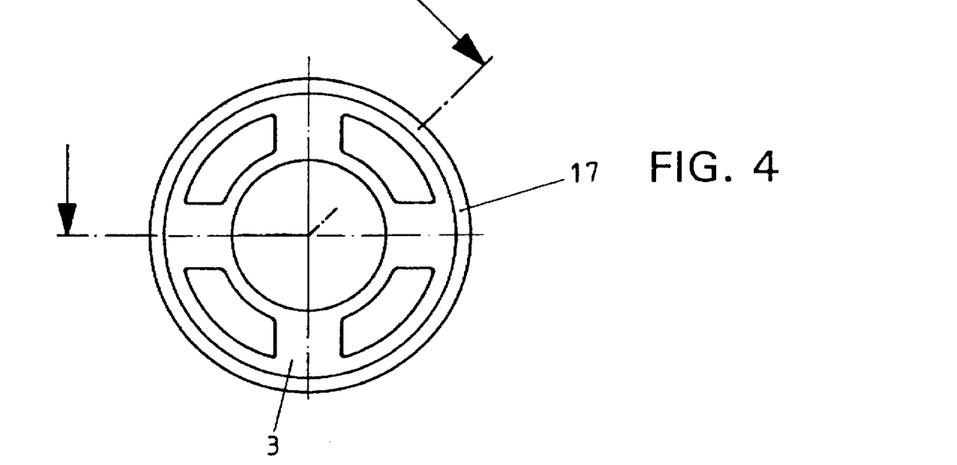
FIGS. 4 and 4a show the detail of the disk facing the equalization chamber.
Figure 4A:
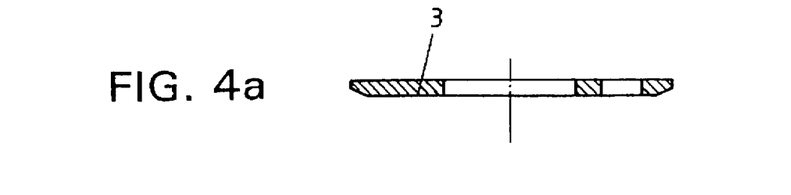
Figure 4B:
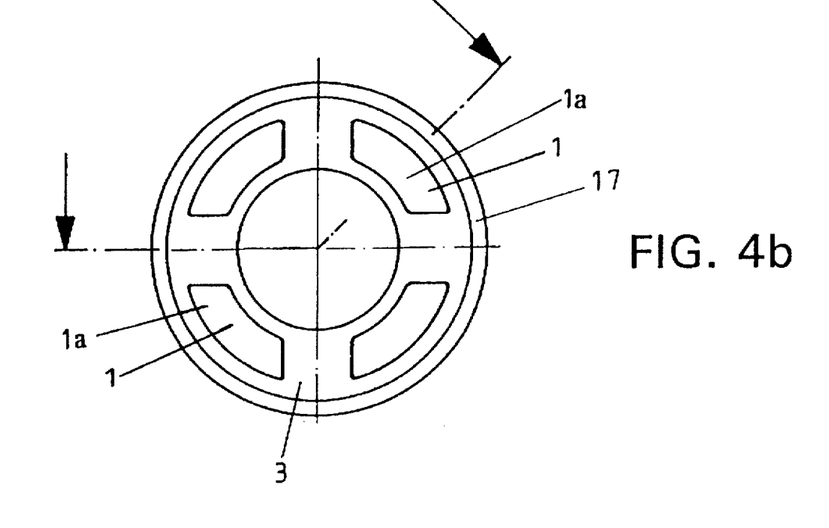
FIGS. 4b and 4c show substantially the same views as FIGS. 4 and 4a but show additional components.
Figure 4C:
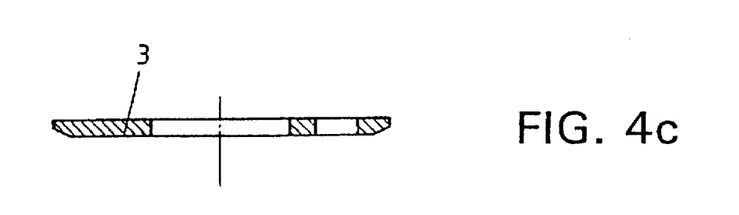

In an embodiment of the invention, as shown in FIGS. 2c and 4b, the flow connections 1 can essentially be formed by truncated pie-shaped holes 1a. These truncated pie-shaped holes 1a preferably have a radial extent with regard to disk 3 and preferably extend about the circumference of disk 3 and disk 4 to essentially form the flow connections 1 for the damping fluid.

FIG. 2c shows the bottom view of disk 3 and disk 4. In an embodiment of the invention, the flow connections 1 can essentially be formed by the apertures or notches 16 of disks 3 and 4. In an embodiment of the invention, the centering projections 9 and the spoke-like projections 9a of the disk 4 preferably fit against the apertures or notches 16 thereby essentially helping to engage disks 3 and 4 into each other.

Figure 2D:
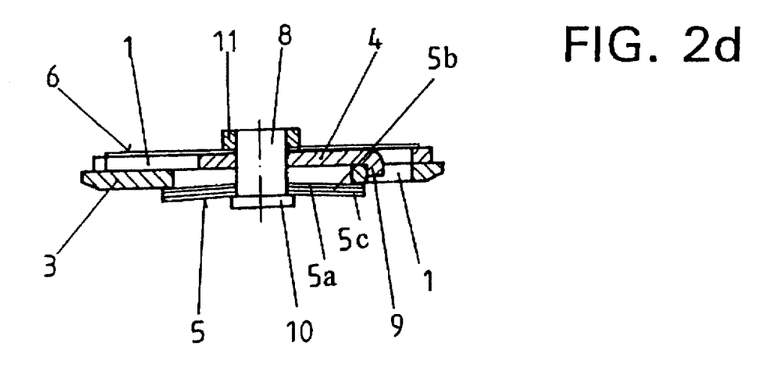

FIG. 2d shows a side view of the disk 4, the bottom disk 3, the valve disk 6, and the valve disk 5. In an embodiment of the invention, as shown in FIG. 2d, the valve disk 5 may essentially be comprised of three disks 5a, 5b, and 5c.

Figure 2E:
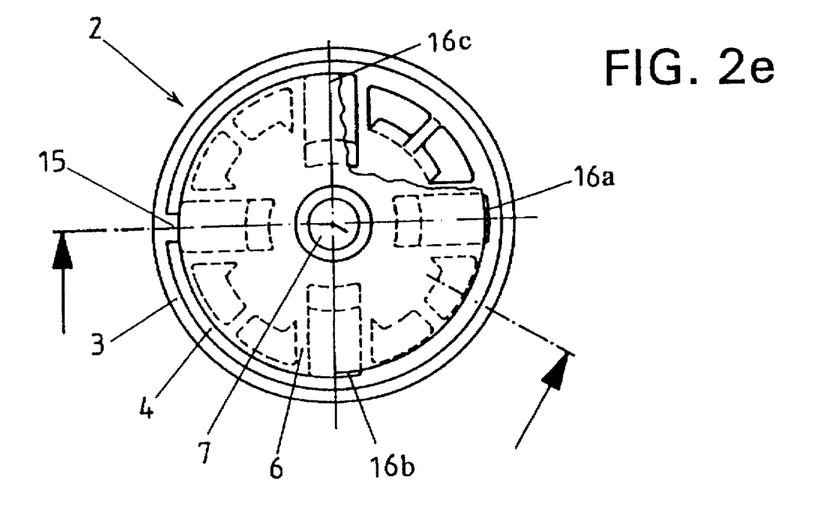

FIG. 2e shows a plan or top view of the disk 4, the bottom disk 3, and the valve disk 6. On the left side, an opening 15 can preferably be formed on the periphery of the adjacent disks 3 and 4. In an embodiment of the invention, there may preferably be small apertures 16a and 16b which abut the peripheral edges of disk 3 or disk 4. In an embodiment of the invention, there may be a closed area 16c which is preferably located opposite apertures 16a or 16b along the peripheral edge of disks 3 and 4. In an embodiment of the invention, only opening 15 may preferably be open when disk 6 is closed. In another embodiment of the invention, there may preferably be additional openings 16a and/or 16b about the disk 6, as shown in FIG. 2e.

Figure 3:
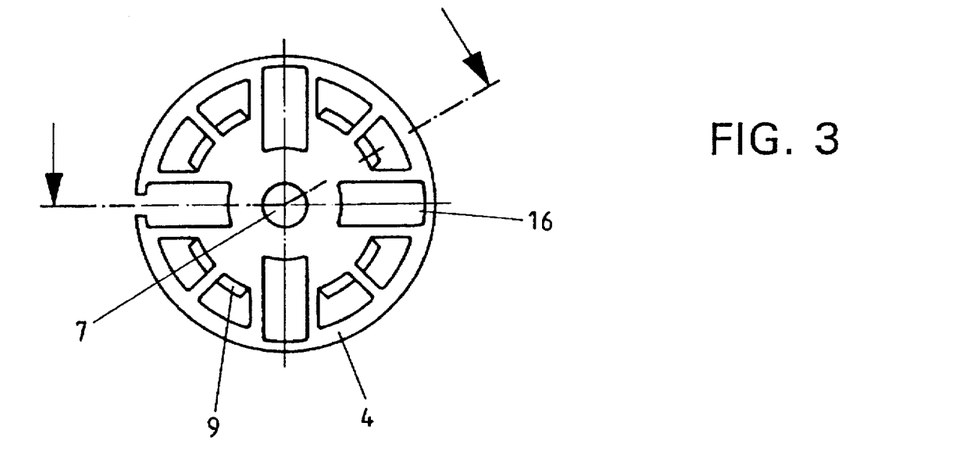
FIGS. 3 and 3a show details of the disk facing the bottom working chamber.
Figure 3A:
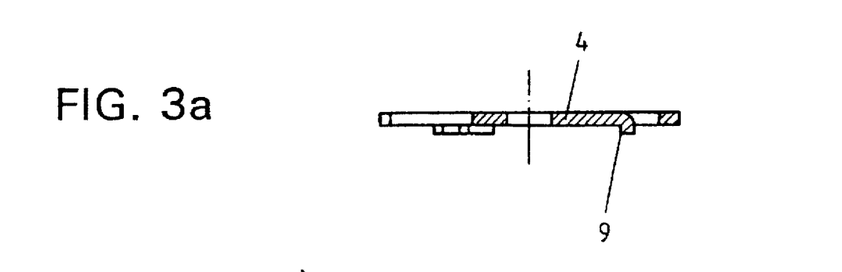

FIGS. 3 and 3a, respectively, show a top and side view of just the disk 4, whereby the notches in this disk have been made by punching, to form the center bore 7 and the centering projections 9 represented as bent portions of the disk 3.

FIGS. 4 and 4a, respectively, show the disk 3, also from the top and from the side, although here there are only notches which interact with the notches in the disk 4 as shown in FIG. 2. The peripheral region 17 of the disk 4 preferably has a larger outside diameter than the disk 3 so that in this case, the work cylinder 12 as shown in FIG. 1 produces an axial pretension between the base area of the vibration damper and the work cylinder 12.

Because disk 4 has a larger diameter than that of disk 3, the peripheral region 17 of disk 4 can essentially act as a seat for the work cylinder 12. Thereby, the base valve 2 can essentially be pushed with a slight force fit into the work cylinder 12 so that the internal axial pretension force of the enclosed vibration damper ensures the seal of the lower work chamber with respect to the equalization chamber.

Figure 5:
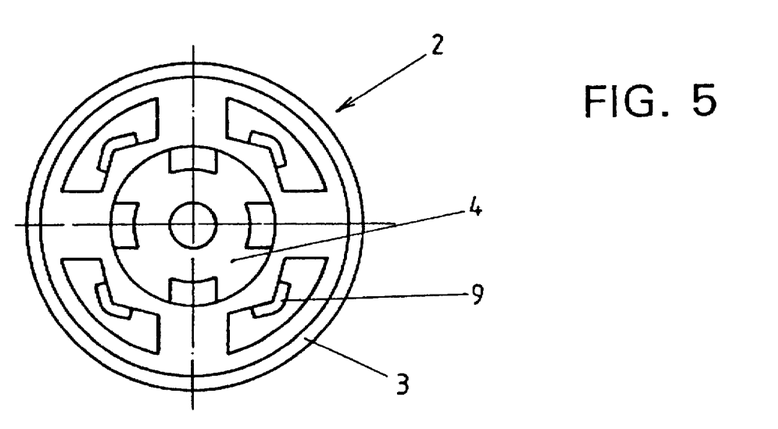
FIG. 5 shows a plan view of another base valve assembly.

FIG. 5 shows an additional assembly of a base valve 2, whereby the disk 4 can essentially be equipped with an additional variant of the centering projections 9, but in which these centering projections 9 also form a positive interlock or form-fit with the notches in disk 3.

Figure 6:
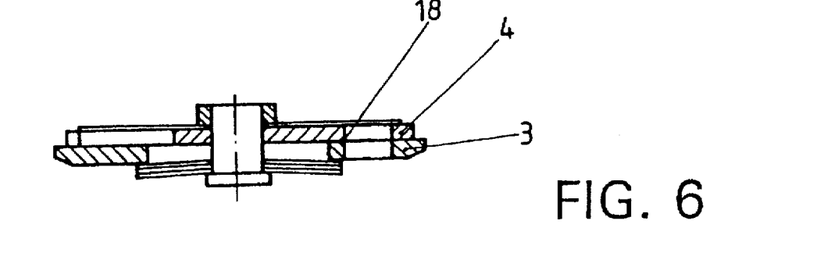
FIGS. 6 through 9 show additional embodiments of the base valve with various positive interlocks.
Figure 7:
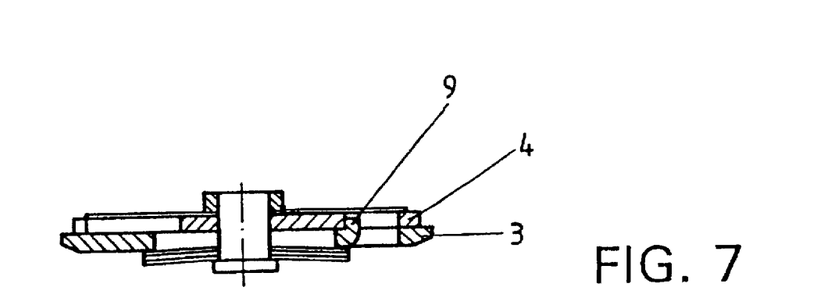
Figure 8:
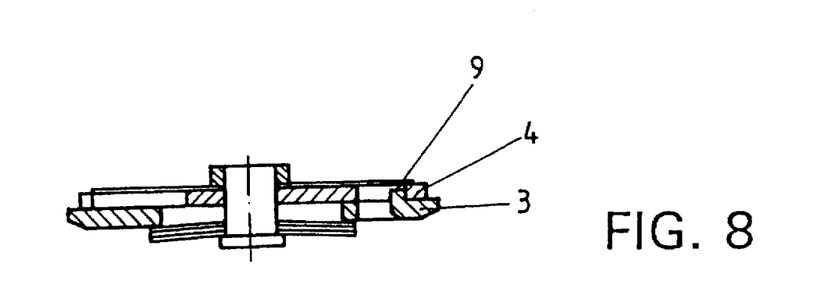
Figure 9:
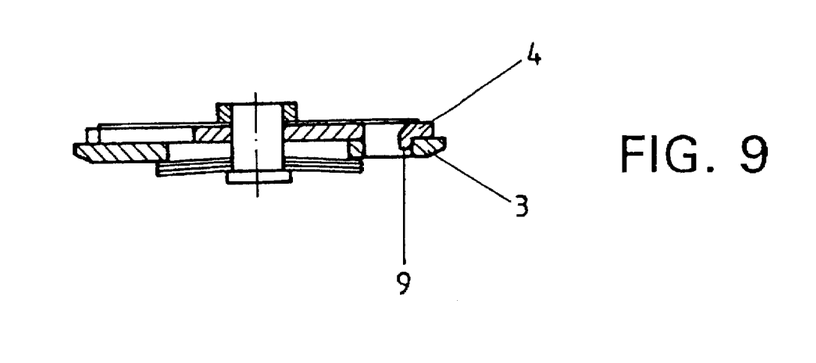

FIGS. 6 through 9 show variants in which, such as in FIG. 6, a laser weld 18 can be used to essentially prevent rotation of the disks, while the embodiments shown in FIGS. 7 through 9 each include centering projections 9 that can either be a part of the disk 3 and are engaged in the notches in the disk 4 or, as shown in FIG. 9, can essentially be part of the disk 4 and are engaged in the notches in the disk 3.

Various types of forming processes which may conceivably be utilized in accordance with the embodiments of the present are disclosed in "Metal Forming Fundamentals and Applications", by Altan et al., published by the American Society for Metals in 1983. Pages 8 through 35 describe various forming techniques and methods which may be used to form various components of the present invention.

Various types of forming machines and forming tools which may conceivably be utilized to form various components of the present invention are also discussed in the aforementioned American Society for Metals publication on pages 103, 119, 120, 126, and 174-177. Some examples of forming machines discussed in the these pages are screw presses, crank presses, rolling mills, and hammers.

Further, the process of plastic deformation, which process in at least some aspects may apply to the forming of the various components of the embodiments of the present invention, is discussed on pages 45-82 of the aforementioned American Society for Metals publication.

The aforementioned American Society for Metals publication, namely "Metal Forming Fundamentals and Applications", the complete text thereof and the specific pages cited hereinabove, are hereby incorporated by reference as if set forth in their entirety herein.

FIG. 10 shows what could be considered to be a typical shock absorber or vibration damper in which the embodiments of the present invention may conceivably be incorporated. It should be understood that the components discussed hereinbelow with reference to FIG. 10 may essentially be considered to be interchangeable with similar components discussed hereinabove with reference to FIGS. 1 through 9.

FIG. 10 shows an essentially complete shock absorber or vibration damper 200, a detailed illustration of the valve unit 201 being omitted for the sake of clarity. The oscillation damper 200 essentially includes a pressure pipe 202 in which a piston 203 on a piston rod 204 divides a working space 205 into an upper or piston-rod-side working chamber 211 and a lower working chamber 206. A bottom valve unit 207 closes the pressure pipe 202 at the lower end thereof. Either the piston and/or the bottom valve may comprise the valve unit as discussed above with regard to the present invention. A fluid path 208 is formed between the pressure pipe 202 and an intermediate pipe 209, the intermediate pipe 209 being arranged concentrically with respect to the pressure pipe 202. A connecting orifice 210 in the pressure pipe 202 connects the upper working chamber 211 with the fluid path 208.

A compensating chamber 212 is confined between the intermediate pipe 209 and a portion of the pressure pipe 202, on the one hand, and the container tube 216 on the other hand. This compensating chamber 212 is axially limited by a base member 214 and a piston rod guiding and sealing unit 215. The working space 205 is separated by the piston 203 into the upper working chamber 211 and the lower working chamber 206. Both the upper and the lower working chambers are filled with a liquid. The compensating chamber 212 is also filled with damping liquid up to the level L, and possibly contains a pressurized gas above the level L. The bottom valve unit 207 provides communication between the working chamber 206 and the compensating chamber 212. The piston 203 provides communication between the lower working chamber 206 and the upper working chamber 211.

The piston rod 204 can also have a protective sleeve 218 attached thereto to essentially protect the piston rod 204 when the piston rod 204 is withdrawn out of the cylinders.

According to an illustrative example, the oscillation damper works as follows: When the piston rod 204 moves upwardly, a high flow resistance occurs across the piston 203 and a high pressure is generated in the upper working chamber 211. Liquid from the upper working chamber 211 flows through said high flow resistance into the lower working chamber 206. As the piston rod 204 moves outward of the working space 205, the available volume within the working space 205 is increased. Therefore, liquid can flow from the compensating chamber 212 through the bottom valve unit 207 into the lower working chamber 206. The flow resistance through the bottom valve unit 207 is small in this phase of operation. The movement of the piston rod 204 with respect to the pressure pipe 202 is damped.

On inward movement of the piston rod 204 fluid flows from the lower working chamber 206 through the piston 203 into the upper working chamber 211. The flow resistance across the piston 203 is relatively small and the flow resistance across the bottom valve unit 207 is relatively large. Therefore, a considerable pressure exists even within the upper working chamber 211. The volume within the working space 205 is reduced by the piston rod 204 entering into the working space 205. Thus, damping liquid must flow from the lower working chamber 206 through the bottom valve unit 207 into the compensating chamber 212. In this phase of operation the flow resistance through the bottom valve unit 207 is high such that a high pressure occurs within the lower working chamber 206 and also within the upper working chamber 211.

By the connecting orifice 210 and the fluid path 208 the upper working chamber 211 is connected with the compensating chamber 212 via the valve unit 201, which can be housed in a housing 217 attached to the container tube 216. Such valve units are generally well known, and are therefor not discussed in any further detail herein. As long as the valve unit 201 is closed, the bypass established by the connecting orifice 210, the fluid path 208 and the valve unit 201 is also closed. This is the hardest mode of operation of the oscillation damper. When, however, the valve unit 201 is more or less opened, the bypass is also open. As a result thereof the following behavior exists: On upward movement of the piston rod 204 liquid can flow from the highly pressurized upper working chamber 211 not only across the piston 203 providing a high flow resistance but also from the working chamber 211 through the bypass 210, 208, 201 to the compensating chamber 212. As such, the damping force is reduced.

When the piston rod 204 moves downwards, there exists again a high pressure within the upper working chamber 211, as described above. Therefore, damping liquid can flow from the upper working chamber 211 through the bypass 210, 208, 201 to the compensating chamber 212. This means that the damping liquid which must be expelled from the working space 205 as a result of the reduced volume therein does not only escape through the bottom valve unit 207 to the compensating chamber 212 but can also partially escape through the bypass 210, 208, 201 to the compensating chamber 212. Such, the damping force is again reduced by the open bypass 210, 208, 207. It is to be noted that the direction of flow of the damping liquid through the bypass 210, 208, 207 is the same, both on upward movement and downward movement of the piston rod 204 with respect to the pressure pipe 202. By increasing the flow resistance through the valve unit 201 the damping force can be increased both for upward and downward movement of the piston rod 204, and by increasingly opening the valve unit 201 the damping force can be reduced both for upward movement and downward movement of the piston rod 204. It is possible to selectively open and close the valve unit or to continuously vary the flow resistance through the valve unit 201.

Examples of shock absorber assemblies and components associated therewith, which may be utilized in accordance with the embodiments of the present invention, may be found in the following U.S. Patents: U.S. Pat. No. 4,986,393, which issued Preukschat et al. on Jan. 22, 1991; U.S. Pat. No. 4,749,070, which issued to Moser et al. on Jun. 7, 1988; and U.S. Pat. No. 4,723,640, which issued to Beck on Feb. 9, 1988.

The corresponding foreign patent publication applications, namely, Federal Republic of Germany Patent Application No. P 44 04 835.1-12, filed on Feb. 16, 1994, having inventor Hubert Beck, and DE-OS P 44 04 835.1-12 and DE-PS P 44 04 835.1-12, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The corresponding foreign patent publication applications, namely, Federal Republic of Germany Patent Application Nos. P 43 15 457.3, filed on May 10, 1993, and P 43 15 458.1, filed on May 10, 1993, having inventors Andreas Forster, Andreas Sieber, Wolfgang Schuhmacher and Hubert Beck, and DE-OS P 43 15 457.3 and P 43 15 458.1 and DE-PS P 43 15 457.3 and P 43 15 458.1, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The German Laid Open Patent Application DE-OS P 43 24 588.9, as well as its published equivalent, and other equivalents or corresponding applications, if any, in corresponding cases in the Federal Republic of Germany and elsewhere, and the references cited in any of the documents cited herein, are hereby incorporated by reference as if set forth in their entirety herein.

One feature of the invention resides broadly in the telescoping vibration damper consisting of a work cylinder, a piston mounted on a piston rod and which divides the work cylinder into two work chambers, and a jacket tube which coaxially surrounds the work cylinder and forms an equalization chamber, whereby a base valve is located in the base of the work cylinder to create a flow connection between the lower work chamber and the equalization chamber, characterized by the fact that at least two disks 3, 4 with notches are mounted non-rotationally with respect to one another to form the flow connection 1 of the base valve 2, whereby the notches of both disks 3, 4 together form the flow connection 1 for the intake and pressure stage, and that the top and bottom of the base valve 2 are covered by valve disks 5, 6.

Another feature of the invention resides broadly in the vibration damper characterized by the fact that the two disks 3, 4 are prevented from rotating by means of a positive interlock, whereby one disk 3 or 4 is at least partly engaged in the other disk 4 or 3.

Yet another feature of the invention resides broadly in the vibration damper characterized by the fact that the disks are laser-welded to prevent them from rotating.

Still another feature of the invention resides broadly in the vibration damper characterized by the fact that the disks 3, 4 are realized as stampings.

A further feature of the invention resides broadly in the vibration damper characterized by the fact that the disks 3, 4 are manufactured from sheet metal.

Another feature of the invention resides broadly in the vibration damper characterized by the fact that the disks 3, 4 and the valve disks 5, 6 have a center bore 7 and all parts are mounted on a common pin 8 and secured on both sides.

Yet another feature of the invention resides broadly in the vibration damper characterized by the fact that at least one disk 3 or 4 is equipped with centering projections 9 which are engaged in the notches of the other disk 4 or 3, forming a positive interlock.

Still another feature of the invention resides broadly in the vibration damper characterized by the fact that the pin 8 has a shoulder 10 on one end and a retaining ring 11 on the other end.

A further feature of the invention resides broadly in the vibration damper characterized by the fact that the retaining ring 11 is bolted, welded, riveted or otherwise fastened to the pin 8.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 06 349.0-12, filed on Feb. 26, 1994, having inventor Hubert Beck, and DE-OS P 44 06 349.0-12 and DE-PS P 44 06 349.0-12, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A vibration damper for damping vibrations of a motor vehicle, said vibration damper comprising:

a first tubular member;

means for attaching said vibration damper to one of: a wheel suspension and a support structure of the motor vehicle;

said first tubular member defining a chamber therewithin, said chamber comprising damping fluid therewithin, and said first tubular member defining a longitudinal dimension;

piston rod means, said piston rod means having a first end within said first tubular member and a second end external to said first tubular member, said piston rod means being movable within said first tubular member in a direction along said longitudinal dimension of said first tubular member;

means for attaching said second end of said piston rod means to the other of: the wheel suspension and the support structure of the motor vehicle;

piston means disposed at said first end of said piston rod means, said piston means having a first side disposed adjacent said piston rod means and a second side opposite to said first side, and said piston means dividing said chamber into a first work chamber adjacent the first side thereof and a second work chamber adjacent the second side thereof;

a base;

said base being disposed at said second work chamber;

a passage for leading damping fluid from said second work chamber;

a base valve disposed in said base said base valve comprising a flow connection of damping fluid between said second work chamber and said passage to permit flow from said second work chamber to said passage;

said base valve comprising at least a first disk and a second disk;

said first disk and said second disk comprising apertures;

said apertures comprising means for mounting said first disk and said second disk non-rotationally with respect to one another to form said flow connection;

said aperture of said first and second disks comprising at least a part of said flow connection between said second work chamber and said passage;

said apertures of said first and second disks comprising at least a first flow connection and a second flow connection;

said first flow connection comprising a first check valve for permitting flow in a direction from said second work chamber to said passage;

said second flow connection comprising a second check valve for permitting flow in a direction from said passage to said second work chamber;

said first check valve comprising at least one valve disk;

said second check valve comprising at least one valve disk;

said base valve having a first side and a second side;

said first valve disk being disposed on said first side of said base valve; and said second valve disk being disposed on said second side of said base valve.

2. The vibration damper according to claim 1, wherein:

said apertures comprising at least a first aperture and a second aperture;

said first valve disk comprising a flexible plate disposed at said first side of said base valve;

said first side of said base valve being disposed toward said second work chamber;

said first side of said base valve comprising a valve seat;

said flexible plate being configured for bending away from said valve seat to open said at least first and second apertures upon fluid pressure in said second work chamber being less than fluid pressure of said second side of said base valve; and said flexible plate being configured for sealing against said valve seat to at least partially block flow of fluid through said at least first and second apertures from said second work chamber to said passage.

3. The vibration damper according to claim 2, wherein:

said flexible plate comprises an outer peripheral edge; and a portion of said outer peripheral edge of said flexible plate defining a radially inner edge of said first aperture.

4. The vibration damper according to claim 3, wherein:

said means for mounting said first disk and said second disk non-rotationally with respect to one another comprising means for positively interlocking;

said means for positively interlocking comprising at least one of projection means and at least one laser weld;

said projection means being disposed in one of said first disk and said second disk; and said projection means projecting one of said first and second disk into the other of said first and said second disk;

said at least one laser weld welding said first disk and said second disk to one another.

5. The vibration damper according to claim 4, wherein:

said first disk and said second disk each comprising an outer peripheral edge;

a fixed passage opening disposed along said outer peripheral edge of one of said first disk and said second disk;

said fixed passage opening being disposed opposite said flexible plate and said at least first aperture of said flexible plate; and said fixed passage opening being configured for permitting fluid flow between said first work chamber and said passage.

6. The vibration damper according to claim 5, wherein:

each of said first disk and said second disk having a circular surface area;

each of said first valve disk and said second valve disk having a circular surface area;

said piston means defining a longitudinal axis substantially parallel to said longitudinal dimension of said first tubular member;

said circular surface areas of said first and said second disks and said first and second valve disks being disposed perpendicular to said longitudinal axis;

each said circular surface area having a central hole;

each said circular surface area having a peripheral portion;

each said circular surface area having a central concentric portion disposed between said peripheral portion and said central hole;

said central concentric portion of each of said first and second disks and said first and second valve disks comprising a plurality of apertures;

said plurality of apertures being disposed radially outwardly of said central concentric portion;

each of said apertures comprising wall portions extending in a direction along said longitudinal axis; and said means for positively interlocking comprising said laser weld between said first disk and said second disk.

7. Vibration damper according to claim 1, wherein said first and second disks are prevented from rotating by means of a positive interlock, whereby one of said first and second disks is at least partly engaged in the other disk.

8. Vibration damper according to claim 1, wherein said first and second disks are laser-welded to prevent them from rotating.

9. Vibration damper according to claim 1, wherein said first and second disks are realized as stampings.

10. Vibration damper according to claim 1, wherein said first and second disks are manufactured from sheet metal.

11. Vibration damper according to claim 1, wherein said means for mounting comprises:

said first and second disks and said first and second valve disks have a center bore;

said base valve comprises a common pin; and said first and second disks and said first and second valve disks are mounted on said common pin and secured on both said first side and said second side of said base valve.

12. Vibration damper according to claim 11, wherein said pin has a shoulder on one end and a retaining ring on the other end.

13. Vibration damper according to claim 12, wherein said retaining ring is one of: bolted, welded, and riveted to said pin.

14. Vibration damper according to claim 1, wherein said means for mounting comprises at least one of said first disk and said second disk is equipped with centering projections;

said centering projections are engaged in said apertures of the other disk, forming a positive interlock.

* * * * *

UNITED STATES PATENT AND TRADEMARK OFFICE
CERTIFICATE OF CORRECTION

PATENT NO. : 5,630,485
DATED : May 20, 1997
INVENTOR(S) : Hubert BECK

It is certified that error appears in the above-indentified patent and that said Letters Patent is hereby corrected as shown below:

In column 3, line 24, before '2', delete "FIG." and insert --FIGS.--.

In column 10, line 1, Claim 1, after the first occurrence of 'said', delete "aperture" and insert --apertures--.

Signed and Sealed this

Seventh Day of October, 1997

Attest:

BRUCE LEHMAN

Attesting Officer

Commissioner of Patents and Trademarks